US010400868B2

(12) United States Patent
Kook et al.

(10) Patent No.: US 10,400,868 B2
(45) Date of Patent: Sep. 3, 2019

(54) MULTI-STAGE TRANSMISSION FOR VEHICLE

(71) Applicants: Hyundai Motor Company, Seoul (KR); Kia Motors Corporation, Seoul (KR)

(72) Inventors: Jae Chang Kook, Gyeonggi-do (KR); Hyun Sik Kwon, Seoul (KR); Ki Tae Kim, Incheon (KR); Won Min Cho, Gyeonggi-do (KR); Seong Wook Hwang, Gyeonggi-do (KR); Seong Wook Ji, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 30 days.

(21) Appl. No.: 15/833,607

(22) Filed: Dec. 6, 2017

(65) Prior Publication Data

US 2019/0063560 A1 Feb. 28, 2019

(30) Foreign Application Priority Data

Aug. 22, 2017 (KR) ........................ 10-2017-0105840

(51) Int. Cl.
*F16H 3/66* (2006.01)

(52) U.S. Cl.
CPC ..... *F16H 3/666* (2013.01); *F16H 2200/0069* (2013.01); *F16H 2200/2015* (2013.01); *F16H 2200/2046* (2013.01)

(58) Field of Classification Search
CPC ............... F16H 3/66; F16H 2200/0069; F16H 2200/2015; F16H 2200/2046
See application file for complete search history.

(56) References Cited

U.S. PATENT DOCUMENTS 9,163,705 B1 * 10/2015 Hwang .................. F16H 3/666
2016/0169349 A1 * 6/2016 Park ........................ F16H 3/666
475/275

FOREIGN PATENT DOCUMENTS

KR 10-2013-0003981 1/2013

* cited by examiner

*Primary Examiner* — Stacey A Fluhart
(74) *Attorney, Agent, or Firm* — Mintz Levin Cohn Ferris Glovsky and Popeo, P.C.; Peter F. Corless

(57) ABSTRACT

A multi-stage transmission for a vehicle includes an input shaft; an output shaft; first, second, third, fourth and fifth planetary gear sets disposed between the input shaft and the output shaft to transmit rotary force, each of the first, second, third, fourth and fifth planetary gear sets having three rotary elements; and six shifting elements connected to the rotary elements of the first, second, third, fourth and fifth planetary gear sets.

7 Claims, 2 Drawing Sheets

MULTI-STAGE TRANSMISSION FOR VEHICLE

CROSS-REFERENCE TO RELATED APPLICATION

This application claims under 35 U.S.C. § 119(a) the benefit of Korean Patent Application No. 10-2017-0105840, filed on Aug. 22, 2017 in the Korean Intellectual Property Office, the entire contents of which are incorporated herein by reference.

BACKGROUND

1. Technical Field

The present disclosure relates to a multi-stage transmission for a vehicle, more particularly to a multi-stage transmission capable of realizing as many shifting stages as desired using a reduced number of components arranged in a simple configuration, thereby improving fuel efficiency of the vehicle.

2. Description of the Related Art

In an environment in which oil prices are unpredictable, automobile manufacturers throughout the world have competed to improve fuel efficiency. Engine research has focused on improving fuel efficiency while decreasing weight by use of novel technology to enable downsizing, or the like, of engine components.

Meanwhile, among methods that can be applied to transmissions provided in vehicles to improve fuel efficiency, there is a method of allowing an engine to operate at more efficient operation points using the multi-staging of a transmission, thereby ultimately improving fuel efficiency.

Further, such multi-staging of a transmission allows an engine to be operated in a relatively low revolution-per-minute (RPM) range to reduce noise of a vehicle.

However, as the number of shifting stages of a transmission increases, the number of internal parts constituting the transmission also increases. This may lead to undesirable effects such as reduced mountability and transfer efficiency and increased cost and weight of the transmission. Therefore, in order to maximize the effect of improved fuel efficiency using the multi-staging of a transmission, it is important to devise a transmission structure that is able to realize maximum efficiency using a reduced number of parts and a relatively simple configuration.

The information disclosed in this Background of the Disclosure section is only for enhancement of understanding of the general background of the disclosure and should not be taken as an acknowledgement or any form of suggestion that this information forms the prior art already known to a person skilled in the art.

SUMMARY

Therefore, the present disclosure provides a multi-stage transmission for a vehicle, which is capable of realizing as many shifting stages as desired using a reduced number of parts, i.e., as few parts as possible, and the simplest configuration possible, thereby improving fuel efficiency of the vehicle.

In accordance with an aspect of the present disclosure, the above and other objects can be accomplished by the provision of a multi-stage transmission for a vehicle, including:

an input shaft; an output shaft; first, second, third, fourth and fifth planetary gear sets disposed between the input shaft and the output shaft to transmit rotary force, each of the first, second, third, fourth and fifth planetary gear sets having three rotary elements; and six shifting elements connected to the rotary elements of the first, second, third, fourth and fifth planetary gear sets, wherein a first rotary element of the first planetary gear set is selectively connected to a transmission case by one of the shifting elements and is fixedly connected to a first rotary element of the second planetary gear set, a second rotary element of the first planetary gear set is fixedly connected to the input shaft, and a third rotary element of the first planetary gear set is fixedly connected to a first rotary element of the third planetary gear set and a first rotary element of the fourth planetary gear set, wherein a second rotary element of the second planetary gear set is fixedly connected to a third rotary element of the fifth planetary gear set, and a third rotary element of the second planetary gear set is selectively connected to the transmission case by another one of the shifting elements, wherein the first rotary element of the third planetary gear set is selectively connected to a third rotary element of the third planetary gear set, and a second rotary element of the third planetary gear set is selectively connected to the second rotary element of the second planetary gear set and is fixedly connected to a second rotary element of the fourth planetary gear set, wherein a third rotary element of the fourth planetary gear set is selectively connected to a first rotary element of the fifth planetary gear set, and wherein the first rotary element of the fifth planetary gear set is selectively connected to the input shaft, and a second rotary element of the fifth planetary gear set is fixedly connected to the output shaft.

The first planetary gear set, the second planetary gear set, the third planetary gear set, the fourth planetary gear set and the fifth planetary gear set may be sequentially arranged in an axial direction of the input shaft and the output shaft.

The first rotary element of the first planetary gear set may be selectively connected to the transmission case by a first brake among the shifting elements, the third rotary element of the second planetary gear set may be selectively connected to the transmission case by a second brake among the shifting elements, and the remaining elements among the shifting elements may form variable connection structures that connect the rotary elements of the first, second, third, fourth and fifth planetary gear sets.

The shifting elements may include a first clutch for forming a variable connection structure that connects the input shaft and the first rotary element of the fifth planetary gear set, a second clutch for forming a variable connection structure that connects the third rotary element of the first planetary gear set and the third rotary element of the third planetary gear set, a third clutch for forming a variable connection structure that connects the second rotary element of the second planetary gear set and the second rotary element of the third planetary gear set, and a fourth clutch for forming a variable connection structure that connects the third rotary element of the fourth planetary gear set and the first rotary element of the fifth planetary gear set.

The third planetary gear set and the fourth planetary gear set may be combined into a single compound planetary gear set.

In accordance with another aspect of the present disclosure, a multi-stage transmission for a vehicle includes: first, second, third, fourth and fifth planetary gear sets, each having three rotary elements; six shifting elements configured to selectively provide frictional force; and first, second, third, fourth, fifth, sixth, seventh, eighth, ninth and tenth rotary shafts connected to the first, second, third, fourth and fifth planetary gear sets, wherein the first rotary shaft is an input shaft directly connected to a second rotary element of the first planetary gear set, the second rotary shaft is directly connected to a first rotary element of the first planetary gear set and a first rotary element of the second planetary gear set, the third rotary shaft is directly connected to a third rotary element of the first planetary gear set, a first rotary element of the third planetary gear set and a first rotary element of the fourth planetary gear set, the fourth rotary shaft is directly connected to a second rotary element of the second planetary gear set and a third rotary element of the fifth planetary gear set, the fifth rotary shaft is directly connected to a third rotary element of the second planetary gear set, the sixth rotary shaft is directly connected to a second rotary element of the third planetary gear set and a second rotary element of the fourth planetary gear set, the seventh rotary shaft is directly connected to a third rotary element of the third planetary gear set, the eighth rotary shaft is directly connected to a third rotary element of the fourth planetary gear set, the ninth rotary shaft is directly connected to a first rotary element of the fifth planetary gear set, and the tenth rotary shaft is an output shaft directly connected to a second rotary element of the fifth planetary gear set, and wherein the six shifting elements include a first clutch disposed between the first rotary shaft and the ninth rotary shaft, a second clutch disposed between the third rotary shaft and the seventh rotary shaft, a third clutch disposed between the fourth rotary shaft and the sixth rotary shaft, a fourth clutch disposed between the eighth rotary shaft and the ninth rotary shaft, a first brake disposed between the second rotary shaft and a transmission case, and a second brake disposed between the fifth rotary shaft and the transmission case.

The first planetary gear set, the second planetary gear set, the third planetary gear set, the fourth planetary gear set and the fifth planetary gear set may be sequentially arranged in an axial direction of the input shaft and the output shaft.

The third planetary gear set and the fourth planetary gear set may be combined into a single compound planetary gear set.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE PREFERRED EMBODIMENTS

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Reference will now be made in detail to the preferred embodiments of the present disclosure, examples of which are illustrated in the accompanying drawings. Wherever possible, the same reference numbers will be used throughout the drawings to refer to the same or like parts.

Figure 1:
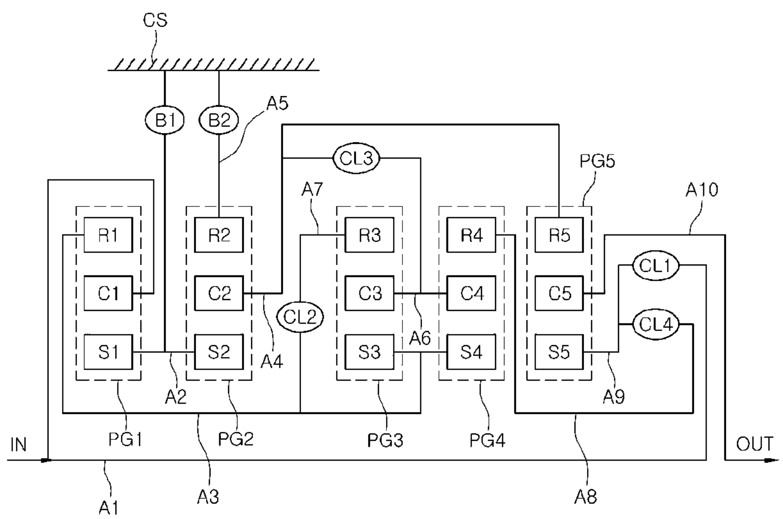
FIG. 1 is a view illustrating a multi-stage transmission for a vehicle according to one embodiment of the present disclosure.

FIG. 1 is a view illustrating a multi-stage transmission for a vehicle according to one embodiment of the present disclosure.

Referring to FIG. 1, the multi-stage transmission for a vehicle according to one embodiment of the present disclosure includes an input shaft IN, an output shaft OUT, first to fifth planetary gear sets PG1, PG2, PG3, PG4 and PG5, each having three rotary elements, disposed between the input shaft IN and the output shaft OUT to transmit rotary force, and six shifting elements connected to the rotary elements of the first to fifth planetary gear sets PG1 to PG5.

A first rotary element S1 of the first planetary gear set PG1 is selectively connected to a transmission case CS by one of the shifting elements and is fixedly connected to a first rotary element S2 of the second planetary gear set PG2. A second rotary element C1 of the first planetary gear set PG1 is fixedly connected to the input shaft IN. A third rotary element R1 of the first planetary gear set PG1 is fixedly connected to a first rotary element S3 of the third planetary gear set PG3 and a first rotary element S4 of the fourth planetary gear set PG4.

A second rotary element C2 of the second planetary gear set PG2 is fixedly connected to a third rotary element R5 of the fifth planetary gear set PG5. A third rotary element R2 of the second planetary gear set PG2 is selectively connected to the transmission case CS by another one of the shifting elements.

The first rotary element S3 of the third planetary gear set PG3 is selectively connected to a third rotary element R3 of the third planetary gear set PG3. A second rotary element C3 of the third planetary gear set PG3 is selectively connected to the second rotary element C2 of the second planetary gear set PG2 and is fixedly connected to a second rotary element C4 of the fourth planetary gear set PG4.

A third rotary element R4 of the fourth planetary gear set PG4 is selectively connected to a first rotary element S5 of the fifth planetary gear set PG5.

The first rotary element S5 of the fifth planetary gear set PG5 is selectively connected to the input shaft IN. A second rotary element C5 of the fifth planetary gear set PG5 is fixedly connected to the output shaft OUT.

The first planetary gear set PG1, the second planetary gear set PG2, the third planetary gear set PG3, the fourth planetary gear set PG4 and the fifth planetary gear set PG5 are sequentially arranged in the axial direction of the input shaft IN and the output shaft OUT.

Therefore, it is possible to realize multi-stage gear shifting through the connection among the first planetary gear set PG1, the second planetary gear set PG2, the third planetary gear set PG3, the fourth planetary gear set PG4 and the fifth planetary gear set PG5 between the input shaft IN, to which power is input, and the output shaft OUT, from which power is output.

The first rotary element S1, the second rotary element C1 and the third rotary element R1 of the first planetary gear set PG1 are a first sun gear, a first carrier and a first ring gear, respectively. The first rotary element S2, the second rotary element C2 and the third rotary element R2 of the second planetary gear set PG2 are a second sun gear, a second carrier and a second ring gear, respectively. The first rotary element S3, the second rotary element C3 and the third rotary element R3 of the third planetary gear set PG3 are a third sun gear, a third carrier and a third ring gear, respectively. The first rotary element S4, the second rotary element C4 and the third rotary element R4 of the fourth planetary gear set PG4 are a fourth sun gear, a fourth carrier and a fourth ring gear, respectively. The first rotary element S5, the second rotary element C5 and the third rotary element R5 of the fifth planetary gear set PG5 are a fifth sun gear, a fifth carrier and a fifth ring gear, respectively.

The first rotary element S1 of the first planetary gear set PG1 is selectively connected to the transmission case CS by a first brake B1 among the shifting elements. The third rotary element R2 of the second planetary gear set PG2 is selectively connected to the transmission case CS by a second brake B2 among the shifting elements. The remaining elements among the shifting elements form variable connection structures that connect the rotary elements of the planetary gear sets.

Therefore, the first brake B1 functions to restrain or permit rotation of the first rotary element S1 of the first planetary gear set PG1 and the first rotary element S2 of the second planetary gear set PG2, and the second brake B2 functions to restrain or permit rotation of the third rotary element R2 of the second planetary gear set PG2.

In addition, among the shifting elements, a first clutch CL1 forms a variable connection structure that connects the input shaft IN and the first rotary element S5 of the fifth planetary gear set PG5. A second clutch CL2 forms a variable connection structure that connects the third rotary element R1 of the first planetary gear set PG1 and the third rotary element R3 of the third planetary gear set PG3. A third clutch CL3 forms a variable connection structure that connects the second rotary element C2 of the second planetary gear set PG2 and the second rotary element C3 of the third planetary gear set PG3. A fourth clutch CL4 forms a variable connection structure that connects the third rotary element R4 of the fourth planetary gear set PG4 and the first rotary element S5 of the fifth planetary gear set PG5.

The multi-stage transmission for a vehicle according to the embodiment configured as above may also be presented as follows.

The multi-stage transmission includes the first to fifth planetary gear sets PG1 to PG5, each having the three rotary elements, and the six shifting elements configured to selectively provide frictional force, and further includes ten rotary shafts connected to the rotary elements of the planetary gear sets.

Specifically, among the ten rotary shafts, a first rotary shaft A1 is the input shaft IN directly connected to the second rotary element C1 of the first planetary gear set PG1. A second rotary shaft A2 is directly connected to the first rotary element S1 of the first planetary gear set PG1 and the first rotary element S2 of the second planetary gear set PG2. A third rotary shaft A3 is directly connected to the third rotary element R1 of the first planetary gear set PG1, the first rotary element S3 of the third planetary gear set PG3 and the first rotary element S4 of the fourth planetary gear set PG4. A fourth rotary shaft A4 is directly connected to the second rotary element C2 of the second planetary gear set PG2 and the third rotary element R5 of the fifth planetary gear set PG5. A fifth rotary shaft A5 is directly connected to the third rotary element R2 of the second planetary gear set PG2. A sixth rotary shaft A6 is directly connected to the second rotary element C3 of the third planetary gear set PG3 and the second rotary element C4 of the fourth planetary gear set PG4. A seventh rotary shaft A7 is directly connected to the third rotary element R3 of the third planetary gear set PG3. An eighth rotary shaft A8 is directly connected to the third rotary element R4 of the fourth planetary gear set PG4. A ninth rotary shaft A9 is directly connected to the first rotary element S5 of the fifth planetary gear set PG5. A tenth rotary shaft A10 is the output shaft OUT directly connected to the second rotary element C5 of the fifth planetary gear set PG5.

In addition, among the six shifting elements, the first clutch CL1 is disposed between the first rotary shaft A1 and the ninth rotary shaft A9. The second clutch CL2 is disposed between the third rotary shaft A3 and the seventh rotary shaft A7. The third clutch CL3 is disposed between the fourth rotary shaft A4 and the sixth rotary shaft A6. The fourth clutch CL4 is disposed between the eighth rotary shaft A8 and the ninth rotary shaft A9. The first brake B1 is disposed between the second rotary shaft A2 and the transmission case CS. The second brake B2 is disposed between the fifth rotary shaft A5 and the transmission case CS.

The multi-stage transmission for a vehicle according to the embodiment of the present disclosure, which is constituted by the five planetary gear sets and the six shifting elements, accomplishes ten forward shifting stages and one reverse shifting stage, the operation modes of which are shown in the following Table 1.

TABLE 1

| SHIFTING STAGE | CL1 | B1 | B2 | CL2 | CL3 | CL4 | GEAR RATIO |
|---|---|---|---|---|---|---|---|
| 1 | ● | ● | ● | | | ○ | 5.100 |
| 2 | | ● | ● | ● | | ● | 3.138 |
| 3 | ● | | ● | ● | | ● | 2.070 |
| 4 | | | ● | ● | ● | ● | 1.692 |
| 5 | ● | | ● | ● | ● | | 1.490 |
| 6 | ● | | ● | | ● | ● | 1.270 |
| 7 | ● | | | ● | ● | ● | 1.000 |
| 8 | ● | ● | | | ● | ● | 0.833 |
| 9 | ● | ● | | ● | ● | | 0.666 |
| 10 | | ● | | ● | ● | ● | 0.615 |
| R1 | | ● | ● | | ● | ● | −4.708 |

In Table 1, symbol "●" represents that a corresponding shifting element is in an operating state, and a blank represents that a corresponding shifting element is in a released state. In addition, symbol "○" represents that a corresponding shifting element is in an engaged state but does not perform torque transmission.

The multi-stage transmission for a vehicle according to the embodiment may realize the first shifting stage according to the operation mode shown in the following Table 2.

TABLE 2

| SHIFTING STAGE | CL1 | B1 | B2 | CL2 | CL3 | CL4 | GEAR RATIO |
|---|---|---|---|---|---|---|---|
| 1 | ● | ● | ● | ○ | | | 5.100 |
| 1 | ● | ● | ● | | ○ | | 5.100 |
| 1 | ● | ● | ● | | | ○ | 5.100 |

As shown in Table 2, the first shifting stage may be realized by operating the first clutch CL1, the first brake B1 and the second brake B2 and selectively switching any one of the remaining shifting elements to an engaged mode.

Figure 2:
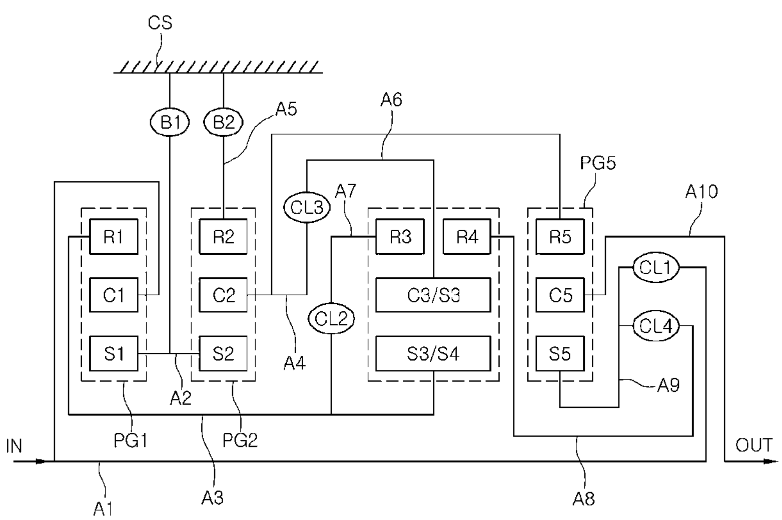
FIG. 2 is a view illustrating a multi-stage transmission for a vehicle according to another embodiment of the present disclosure.

FIG. 2 is a view illustrating a multi-stage transmission for a vehicle according to another embodiment of the present disclosure.

Referring to FIG. 2, the multi-stage transmission for a vehicle according to another embodiment is distinguished from that according to the previous embodiment in that the third planetary gear set PG3 and the fourth planetary gear set PG4 are combined into a single compound planetary gear set. That is, the first rotary element S3 of the third planetary gear set PG3 is fixedly connected to the first rotary element S4 of the fourth planetary gear set PG4, and the second rotary element C3 of the third planetary gear set PG3 is fixedly connected to the second rotary element C4 of the fourth planetary gear set PG4. As such, since the third planetary gear set PG3 and the fourth planetary gear set PG4 are combined into a single compound planetary gear set, it is possible to reduce the number of planetary gears that are used for the transmission. As a result, the weight and the volume of the multi-stage transmission may be reduced.

As is apparent from the above description, the present disclosure provides a multi-stage transmission for a vehicle, which is capable of realizing ten forward shifting stages and one reverse shifting stage in a manner such that rotary elements constituting a plurality of planetary gear sets are driven such that the rotating speeds and the rotating directions thereof are changed by selective connecting/disconnecting operation of clutches and brakes.

Accordingly, it is possible to improve fuel efficiency through accomplishment of multi-stage gear shifting of an automatic transmission and to improve the quietness of a vehicle by allowing an engine to be operated in a relatively low RPM range.

Although the preferred embodiments of the present disclosure have been disclosed for illustrative purposes, those skilled in the art will appreciate that various modifications, additions and substitutions are possible, without departing from the scope and spirit of the disclosure as disclosed in the accompanying claims.

What is claimed is:

1. A multi-stage transmission for a vehicle, comprising:

an input shaft;

an output shaft;

first, second, third, fourth and fifth planetary gear sets disposed between the input shaft and the output shaft to transmit rotary force, each of the first, second, third, fourth and fifth planetary gear sets having three rotary elements; and six shifting elements connected to the rotary elements of the first, second, third, fourth and fifth planetary gear sets, wherein a first rotary element of the first planetary gear set is selectively connected to a transmission case and is fixedly connected to a first rotary element of the second planetary gear set, a second rotary element of the first planetary gear set is fixedly connected to the input shaft, and a third rotary element of the first planetary gear set is fixedly connected to a first rotary element of the third planetary gear set and a first rotary element of the fourth planetary gear set, wherein a second rotary element of the second planetary gear set is fixedly connected to a third rotary element of the fifth planetary gear set, and a third rotary element of the second planetary gear set is selectively connected to the transmission case, wherein the first rotary element of the third planetary gear set is selectively connected to a third rotary element of the third planetary gear set, and a second rotary element of the third planetary gear set is selectively connected to the second rotary element of the second planetary gear set and is fixedly connected to a second rotary element of the fourth planetary gear set, wherein a third rotary element of the fourth planetary gear set is selectively connected to a first rotary element of the fifth planetary gear set, wherein the first rotary element of the fifth planetary gear set is selectively connected to the input shaft, and a second rotary element of the fifth planetary gear set is fixedly connected to the output shaft, and wherein the first planetary gear set, the second planetary gear set, the third planetary gear set, the fourth planetary gear set and the fifth planetary gear set are sequentially arranged in an axial direction of the input shaft and the output shaft.

2. The multi-stage transmission according to claim 1, wherein the first rotary element of the first planetary gear set is selectively connected to the transmission case by a first brake among the shifting elements, wherein the third rotary element of the second planetary gear set is selectively connected to the transmission case by a second brake among the shifting elements, and wherein remaining elements among the shifting elements selectively connect the rotary elements of the first, second, third, fourth and fifth planetary gear sets.

3. The multi-stage transmission according to claim 2, wherein the shifting elements include:

a first clutch selectively connecting the input shaft and the first rotary element of the fifth planetary gear set;

a second clutch selectively connecting the third rotary element of the first planetary gear set and the third rotary element of the third planetary gear set;

a third clutch selectively connecting the second rotary element of the second planetary gear set and the second rotary element of the third planetary gear set; and a fourth clutch selectively connecting the third rotary element of the fourth planetary gear set and the first rotary element of the fifth planetary gear set.

4. The multi-stage transmission according to claim 3, wherein the third planetary gear set and the fourth planetary gear set are combined into a single compound planetary gear set.

5. A multi-stage transmission for a vehicle, comprising:

first, second, third, fourth and fifth planetary gear sets, each having three rotary elements;

six shifting elements configured to selectively provide frictional force; and first, second, third, fourth, fifth, sixth, seventh, eighth, ninth and tenth rotary shafts connected to the first, second, third, fourth and fifth planetary gear sets, wherein the first rotary shaft is an input shaft directly connected to a second rotary element of the first planetary gear set;

the second rotary shaft is directly connected to a first rotary element of the first planetary gear set and a first rotary element of the second planetary gear set;

the third rotary shaft is directly connected to a third rotary element of the first planetary gear set, a first rotary element of the third planetary gear set and a first rotary element of the fourth planetary gear set;

the fourth rotary shaft is directly connected to a second rotary element of the second planetary gear set and a third rotary element of the fifth planetary gear set;

the fifth rotary shaft is directly connected to a third rotary element of the second planetary gear set;

the sixth rotary shaft is directly connected to a second rotary element of the third planetary gear set and a second rotary element of the fourth planetary gear set;

the seventh rotary shaft is directly connected to a third rotary element of the third planetary gear set;

the eighth rotary shaft is directly connected to a third rotary element of the fourth planetary gear set;

the ninth rotary shaft is directly connected to a first rotary element of the fifth planetary gear set; and the tenth rotary shaft is an output shaft directly connected to a second rotary element of the fifth planetary gear set, wherein the first planetary gear set, the second planetary gear set, the third planetary gear set, the fourth planetary gear set and the fifth planetary gear set are sequentially arranged in an axial direction of the input shaft and the output shaft.

6. The multi-stage transmission according to claim 5, wherein the six shifting elements include a first clutch disposed between the first rotary shaft and the ninth rotary shaft, a second clutch disposed between the third rotary shaft and the seventh rotary shaft, a third clutch disposed between the fourth rotary shaft and the sixth rotary shaft, a fourth clutch disposed between the eighth rotary shaft and the ninth rotary shaft, a first brake disposed between the second rotary shaft and a transmission case, and a second brake disposed between the fifth rotary shaft and the transmission case.

7. The multi-stage transmission according to claim 5, wherein the third planetary gear set and the fourth planetary gear set are combined into a single compound planetary gear set.

* * * * *